United States Patent [19]

Willis

[11] Patent Number: 4,730,022

[45] Date of Patent: Mar. 8, 1988

[54] POLYMER COMPOSITIONS AND ALKALINE ZINC ELECTROPLATING BATHS

[75] Inventor: William J. Willis, North Royalton, Ohio

[73] Assignee: McGean-Rohco, Inc., Cleveland, Ohio

[21] Appl. No.: 22,390

[22] Filed: Mar. 6, 1987

[51] Int. Cl.$^4$ .................. C08L 79/04; C08G 73/06
[52] U.S. Cl. .................. 524/800; 528/405; 204/55.1
[58] Field of Search .................. 528/405; 524/800

[56] References Cited

U.S. PATENT DOCUMENTS

| | | | |
|---|---|---|---|
| 3,411,996 | 11/1968 | Rushmere | 204/50 |
| 3,824,158 | 7/1974 | Rosenberg | 204/55 |
| 3,849,325 | 11/1974 | Kampe | 252/79.1 |
| 3,869,358 | 3/1975 | Nobel et al. | 204/55 |
| 3,871,974 | 3/1975 | Duchene et al. | 204/55 |
| 3,954,575 | 5/1976 | Yanagida et al. | 528/405 X |
| 3,972,789 | 8/1976 | Eppensteiner et al. | 528/405 X |
| 3,974,045 | 8/1976 | Takahashi et al. | 528/405 X |
| 3,988,219 | 10/1976 | Rosenberg | 528/405 X |
| 4,038,161 | 7/1977 | Eckles et al. | 528/405 X |
| 4,045,306 | 8/1977 | Senge et al. | 204/55 R |
| 4,046,648 | 9/1977 | Rushmere | 528/405 X |
| 4,146,442 | 3/1979 | McFarland | 204/55 |
| 4,169,771 | 10/1979 | Creutz et al. | 204/55 R |
| 4,169,772 | 10/1979 | Lowery et al. | 204/55 R |
| 4,188,271 | 2/1980 | Eckles et al. | 204/55 |
| 4,397,717 | 8/1983 | Acimovic et al. | 204/55 |
| 4,559,058 | 12/1985 | Bennett et al. | 528/405 X |

*Primary Examiner*—Earl Nielsen
*Attorney, Agent, or Firm*—Renner, Otto, Boisselle & Lyon

[57] ABSTRACT

Compositions are described which are useful particularly in improving the electrodeposition of zinc from aqueous alkaline plating baths. In one embodiment, the new composition comprises a polymeric composition prepared by the process which comprises the steps of (A) preparing an intermediate by reacting
   (A-1) at least one nitrogen-containing heterocyclic compound with
   (A-2) an epihalohydrin, glycerolhalohydrin or mixtures thereof, and
(B) reacting said intermediate with at least one amidine compound to form the desired polymeric composition.

Aqueous alkaline zinc electroplating baths containing the compositions of the invention with or without cyanide present, deposit a bright and lustrous zinc coating on metal over a wide range of current densities.

29 Claims, No Drawings

POLYMER COMPOSITIONS AND ALKALINE ZINC ELECTROPLATING BATHS

BACKGROUND OF THE INVENTION

This invention relates to new polymeric compositions, and to improvements in the electrodeposition of zinc from aqueous alkaline zinc plating baths. More particularly, the invention relates to new compositions which are particularly suitable as brightener additives for aqueous alkaline zinc electrodepositing baths.

Considerable attention has been directed to the development of zinc electroplating baths which will produce zinc deposits of improved quality. Research has been devoted to improving the over-all brightness, the range of allowable current densities, and the ductility of the zinc coatings. Many of the successful aqueous alkaline zinc plating baths contain various quantities of sodium cyanide and various brightener compositions to improve the brightness of the zinc deposits. Although the alkaline cyanide baths generally are less expensive to operate and are particularly effective in plating substrates having recesses (such as cup shapes), the trend has been to develop zinc plating baths requiring lesser amounts of cyanide or no cyanide since the cyanides are toxic. The toxicity of the cyanide materials presents serious problems of disposal, particularly since waste disposal has come under the scrutiny of the federal and state governments resulting in the passage of a number of laws and regulations regarding the disposal of waste materials.

Alkaline zinc plating baths generally are based on a solution of zinc ions and an excess of a base such as sodium hydroxide and water. High pH alkaline zinc baths when used without brightening or addition agents yield deposits which are rough and spongy, and generally unacceptable for most applications. In a number of cases, production experience has demonstrated that alkaline zinc electroplating baths perform better if a small amount, e.g., less than 15 g/l, of cyanide is included in the bath.

Cyanide-free or substantially cyanide-free alkaline zinc plating baths containing various organic additives have been described in the prior art. For example, U.S. Pat. No. 3,824,158 describes an aqueous alkaline zinc electroplating bath containing an epihalohydrin quaternary salt of aminated polyepichlorohydrin, and the bath is described as being useful for producing bright lustrous electrodeposits of zinc without requiring any cyanide.

U.S. Pat. No. 3,869,358 describes an aqueous alkaline zinc electroplating bath which contains less than about two ounces per gallon of cyanide and which contains a water soluble product containing recurring tertiary and/or quaternary amine groups where the product is made by reacting an amine with an epihalohydrin. U.S. Pat. No. 3,849,325 also relates to the deposition of a bright zinc coating from an alkaline zinc electroplating bath which contains little or no cyanide. The brightening agent which is incorporated into the bath is obtained by the reaction of a nitrogen-containing heterocyclic compound such as pyridine, pyrazine, quinoline and derivatives thereof, an acyclic amine having at least two functional groups, formaldehyde and an epihalohydrin or a glycerol halohydrin.

Organic additives also have been developed which, when included in the cyanide-free plating baths, do provide electrodeposits of fair quality. Efforts have continued in the art to develop brightener additive compositions which will significantly improve the brightness and ductility of the zinc deposit. For example, a non-cyanide alkaline zinc electroplating bath is described in U.S. Pat. No. 3,871,974 wherein the bath contains quaternized polymeric condensates of alkylene polyamines and epihalohydrins in mixture with aldehyde-type brighteners and mercapto-substituted heterocyclic compounds. These additives are reported to produce bright deposits over a broad current density range.

A brightener additive for alkaline zinc plating baths has been described in U.S. Pat. No. 3,954,575 wherein the brightener additive comprises a watersoluble polymer prepared by the reaction of at least one epihalohydrin with at least one nitrogen heterocyclic compound. This additive is useful in both cyanide-containing and cyanide-free alkaline zinc plating baths. In U.S. Pat. No. 3,974,045, another water-soluble polymer additive for alkaline zinc plating baths is described which is prepared by reacting at least one epihalohydrin with at least one nitrogen heterocyclic compound such as the compounds of imidazole, pyrrole, cyclic amines and piperazine in the presence of at least one nitrogen compound such as the compounds of aliphatic amines, hexamethylene tetramine and ammonia. The brightener additive is useful in both cyanide-containing and cyanide-free alkaline zinc plating baths.

U.S. Pat. No. 4,397,717 describes alkaline zinc plating baths containing one or more reaction products obtained by first reacting an epihalohydrin with a heterocyclic nitrogen compound having at least two nitrogen atoms to form an intermediate, and then reacting the intermediate with ammonia, an aliphatic amine, polyamine and/or polyimine. The bath also contains the reaction product of a polyvalent alcohol with epichlorohydrin and a nitrogen-containing heterocyclic compound.

U.S. Pat. No. 4,188,271 describes compositions prepared by reacting formaldehyde with a mixture of one or more piperazines and one additional nitrogen compound such as ammonia or aliphatic, alicyclic compounds containing at least one primary amine group to form an intermediate which is then reacted with an epihalohydrin or glycerol halohydrin. These compositions are useful in aqueous alkaline zinc electroplating baths for producing bright metallic zinc deposits.

SUMMARY OF THE INVENTION

The present invention comprises a novel polymeric composition prepared by the process which comprises the steps of (A) preparing an intermediate by reacting (A-1) at least one nitrogen-containing heterocyclic compound with (A-2) an epihalohydrin, glycerolhalohydrin or mixtures thereof, and (B) reacting said intermediate with at least one amidine compound to form the desired polymeric composition.

Aqueous alkaline zinc electroplating baths containing the compositions of the invention, with or without cyanide present, deposit a bright and lustrous zinc coating on metal over a wide range of current densities.

DESCRIPTION OF THE PREFERRED EMBODIMENTS

The compositions of this invention are obtained by the process comprising the steps of
(A) preparing an intermediate by reacting
 (A-1) at least one nitrogen-containing heterocyclic compound with
 (A-2) an epihalohydrin, glycerolhalohydrin or mixtures thereof, and
(B) reacting said intermediate with at least one amidine compound to form the desired polymeric composition.

(A-1): Nitrogen-Containing Heterocyclic Compounds

The nitrogen-containing heterocyclic compounds utilized in the preparation of the polymeric compounds of this invention include heterocyclic compounds containing one, two or three nitrogen atoms. Examples of types of such nitrogen-containing heterocyclic compounds include pyrrole, imidazole, pyrazole, 1,2,3-triazole, 1,2,4-triazole, piperazine, saturated cyclic amines of the formula

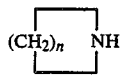  (I)

wherein n is 2–5, and various derivatives of any of these heterocyclic compounds such as derivatives wherein the hydrogen atom of the imino group and/or a ring hydrogen atom are substituted with a hydroxyl, alkyl, amino or acetyl group. Specific examples of useful nitrogen-containing heterocyclic compounds include imidazole, 1-methyl imidazole, 2-methyl imidazole, 1,4-dimethyl imidazole, 4-hydroxy-2-amino imidazole, 5-ethyl-4-hydroxy imidazole, 2,5-dimethyl pyrrole, 1-ethyl pyrrole, 1-acetyl pyrrole, 1-methyl pyrrole, 2-methyl pyrazole, 4-methyl pyrazole, piperazine, N-methyl piperazine, N,N-dimethyl piperazine, 2-methyl piperazine, N,N-diethyl piperazine, 2,5-dimethyl piperazine, and 2-ethyl piperazine. Examples of cyclic amines include ethyleneimine, pyrrolidine, N-methyl pyrrolidine, piperidine, 1-methyl piperidine, 2-methyl piperidine, 3-methyl piperidine, 4-methyl piperidine, 2,6-dimethyl piperidine and 3,5-dimethyl piperidine.

Any of the above nitrogen-containing heterocyclic compounds or mixtures thereof are reacted in accordance with the process of the present invention with (A-2) an epihalohydrin, glycerolhydrin, or mixtures thereof to form an intermediate. Generally, this reaction is carried out in aqueous medium.

The epihalohydrins that are useful in the preparation of the intermediates of the invention include those having the formula

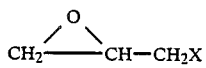  (II)

wherein X is chloro or bromo. Epichlorohydrin is particularly preferred. In lieu of or in addition to the epihalohydrins, glycerolhalohydrins having the following formula may be utilized.

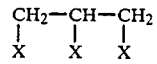  (III)

wherein at least one but not more than two of the X's are hydroxy groups and the remaining X's are chlorine or bromine. Examples of such reactants include, for example, 1,3-dichloro-2-hydroxy propane; 3-chloro-1,2-dihydroxy propane and 2,3-dichloro-1-hydroxy propane.

The amount of epihalohydrin and/or glycerolhalohydrin reacted with the nitrogen-containing heterocyclic compounds may vary over a wide range, but generally, from about 0.2 to about 5 moles of the epihalohydrin or glycerolhalohydrin are included in the reaction mixture per mole of nitrogen-heterocyclic compound. In one preferred embodiment, the nitrogen heterocyclic compound is reacted with a slight molar excess of epihalohydrin or glycerolhalohydrin such as from about 1.1 to about 1.3 mole of epihalohydrin or glycerolhalohydrin per mole of nitrogen-containing heterocyclic compound.

The reaction between the nitrogen-containing heterocyclic compound and the epihalohydrin or glycerolhalohydrin is conducted at from room temperature up to but below the reflux temperature of the mixture. More generally, the reaction is exothermic and the temperature of the reaction mixture is maintained at a temperature below the reflux temperature of the mixture such as, for example, from about 70°–85° C. The temperature of the reaction mixture may be controlled by the rate of addition of the epihalohydrin or glycerolhalohydrin and further by external cooling. The intermediate formed by this reaction is not isolated, and after all of the epihalohydrin or glycerolhalohydrin has been added to the nitrogen-containing compound, the intermediate is then reacted with at least one amidine compound to form the desired polymer. Among the amidine compounds which are useful in preparing the polymer compositions of the present invention are those represented by the following formula.

$$R^1 C(NR^2) N(R^3)_2 \qquad (IV)$$

wherein $R^1$ is hydrogen, lower alkyl, aryl or $N(R^3)_2$; $R^2$ is hydrogen, lower alkyl or cyano group, and each $R^3$ is hydrogen or lower alkyl. The amidine compounds utilized in the process of the present invention may be, and generally are, in the form of their acid salts such as the hydrochloride, acetate or sulfate salts. The amount of amidine included in the reaction generally will be from about 0.05 to about 2 moles of amidine per mole of nitrogen-containing heterocyclic compound utilized in the preparation of the intermediate. In one preferred embodiment, a number of moles of amidine included in the reaction mixture will be less than the number of moles of nitrogen-containing heterocyclic compound, for example, from about 0.08 to about 0.3 mole of amidine compound per mole of nitrogen-containing heterocyclic compound.

Specific examples of amidines which are useful in the preparation of the polymeric compositions of the present invention include guanidine, guanidine hydrochloride, guanidine sulfate, formamidine, formamidine hydrochloride, formamidine acetate, 1,1,3,3-tetramethyl guanidine, acetamidine acetate, benzamidine hydrochloride, cyanoguanidine, etc.

In the process of the present invention, the amidine compound may be added to the intermediate as an aqueous solution having a pH of from about 6–12 (more generally, 10–12), or the amidine may be added neat. After the amidine is added to the intermediate, the reaction mixture is heated to an elevated temperature, generally at reflux, for a period of from about 1 to 3 hours. The mixture may be heated for longer periods of time, but the reaction generally is completed within 3 hours.

The following examples illustrate the preparation of polymeric compositions of this invention which are particularly useful as brightener additives in aqueous alkaline electroplating baths. Unless otherwise indicated in the following examples, in the claims and elsewhere in this specification, all parts and percentages are by weight and all temperatures are in degrees centigrade.

EXAMPLE 1

Imidazole (68.7 parts, 1.008 moles) is dissolved in 270 parts of water, and the solution is warmed to 27° C. Epichlorohydrin (110.7 parts, 1.2 moles) is added dropwise, and the reaction is exothermic. External cooling is applied as needed to maintain the reaction temperature at 75°–80° C. A solution of 9.6 parts of guanidine hydrochloride in 60 parts of water is prepared, and the pH of the solution raised to about 10–12 with 50% sodium hydroxide. This solution is added to the reaction vessel, and the mixture is heated at reflux for about 1.5 hours. The resulting liquid is allowed to cool to room temperature and is recovered as the desired product.

EXAMPLES 2 TO 17

The general procedure used for the preparation of the polymers in these examples is generally as follows: The nitrogen-containing heterocyclic compound and water are combined, and the stirred solution is warmed to 30°–60° C. Epichlorohydrin is then added dropwise with cooling as needed to maintain the reaction temperature below 100° C. When the epichlorohydrin addition is completed, the amidine compound is added neat or as an aqueous solution having a pH of from 6–12. After the amidine compound has been added, the reaction mixture is heated at reflux for 1–3 hours. On cooling, the product is recovered.

TABLE

| Example | Components | Parts by Weight | Moles | pH |
|---|---|---|---|---|
| 2 | Imidazole | 22.9 | 0.336 | 8.7 |
|   | Water | 90 ml | — | |
|   | Epichlorohydrin | 36.9 | 0.4 | |
|   | Guanidine Sulfate | 6.5/30 ml water | 0.03 | |
| 3 | Imidazole | 22.9 | 0.336 | |
|   | Water | 90 ml | — | |
|   | Epichlorohydrin | 36.9 | 0.4 | |
|   | Cyanoguanidine | 4.2/20 ml water | 0.05 | |
| 4 | 2-methyl imidazole | 27.6 | 0.336 | 6 |
|   | Water | 90 ml | — | |
|   | Epichlorohydrin | 36.9 | 0.4 | |
|   | Formamidine HCl | 3.2/20 ml water | 0.04 | |
| 5 | Imidazole | 22.9 | 0.336 | |
|   | Water | 90 ml | — | |
|   | Epichlorohydrin | 36.9 | 0.4 | |
|   | 1,1,3,3-tetramethylguanidine | 2.3/20 ml water | 0.02 | |
| 6 | Imidazole | 22.9 | 0.336 | 10 |
|   | Water | 90 ml | — | |
|   | Epichlorohydrin | 36.9 | 0.4 | |
|   | Guanidine HCl | 3.2/20 ml water | 0.033 | |
| 7 | Imidazole | 11.45 | 0.168 | 10 |
|   | Water | 40 ml | — | |
|   | Epichlorohydrin | 18.45 | 0.2 | |
|   | Benzamidine HCl | 3.2/15 ml water | 0.199 | |
| 8 | Imidazole | 22.9 | 0.336 | 9 |
|   | Water | 90 ml | — | |
|   | Epichlorohydrin | 36.45 | 0.4 | |
|   | Acetamide Acetate | 4.7/20 ml water | 0.039 | |
| 9 | Imidazole | 22.9 | 0.336 | 9.5 |
|   | Water | 90 ml | — | |
|   | Epichlorohydrin | 40 | 0.432 | |
|   | Formamidine HCl | 8.0/20 ml water | 0.099 | |
| 10 | Imidazole | 22.9 | 0.336 | 10 |
|   | Water | 90 ml | — | |
|   | Epichlorohydrin | 36.9 | 0.4 | |
|   | Formamidine | 4.2/20 ml water | 0.04 | |
| 11 | Imidazole | 22.9 | 0.336 | 8.7 |
|   | Water | 90 ml | — | |
|   | Epichlorohydrin | 50 | 0.540 | |
|   | Guanidine Sulfate | 6.5/30 ml water | 0.041 | |
| 12 | Piperazine | 14.2 | 0.165 | |
|   | Water | 60 ml | — | |
|   | Epichlorohydrin | 16.6 | 0.18 | |
|   | Guanidine HCl | 1.5/10 ml water | 0.016 | |
| 13 | 1,2-dimethyl imidazole | 32.3 | 0.330 | |
|   | Water | 90 ml | — | |
|   | Epichlorohydrin | 36.9 | 0.4 | |
|   | Formamidine HCl | 4.0/20 ml water | 0.045 | |
| 14 | 1-methyl imidazole | 27.6 | 0.332 | |
|   | Water | 90 ml | — | |
|   | Epichlorohydrin | 36.9 | 0.4 | |
|   | Guanidine HCl | 3.2/20 ml water | 0.033 | |
| 15 | Pyrrole | 22.5 | 0.335 | |
|   | Water | 90 ml | — | |
|   | Epichlorohydrin | 36.9 | 0.4 | |
|   | Acetamidine Acetate | 3.2/20 ml water | 0.026 | |
| 16 | 2-ethyl imidazole | 32.3 | 0.332 | |
|   | Water | 90 ml | — | |
|   | Epichlorohydrin | 46.2 | 0.50 | |
|   | Guanidine HCl | 3.2/20 ml water | 0.033 | |
| 17 | Imidazole | 11.0 | 0.16 | |
|   | 2-methyl imidazole | 13.8 | 0.16 | |
|   | Water | 90 ml | — | |
|   | Epichlorohydrin | 46.2 | 0.50 | |
|   | Acetamidine HCl | 4.7/20 ml water | 0.05 | |

The polymeric compositions of the invention described above and which are exemplified in Examples 1–17 are useful particularly as brightening additive compositions for aqueous alkaline zinc electroplating baths. In one embodiment, the additive concentrates of the polymeric compositions are prepared, and the concentrates are added to the plating bath as desired. Concentrations of from about 10% to 90% by weight of the polymer in water are satisfactory.

The amount of polymeric composition added to alkaline zinc electroplating baths is an amount which will be effective in producing a bright, lustrous and generally level deposit of zinc. Depending on the particular plating bath and the nature of the other compounds contained in the bath, the effective brightening amount of the compositions of the invention may range from about 0.01 to as much as 15–20 grams per liter of bath.

The efficacy of the zinc electroplating baths containing the compositions of the invention may be improved further by including various other materials in the plating bath, and the nature of such materials generally will depend upon whether the plating bath is an alkaline cyanide bath or an alkaline non-cyanide bath. In one embodiment, the compositions of the invention are added to low-cyanide or non-cyanide baths and more preferably to non-cyanide zinc electroplating baths. Low-cyanide zinc electroplating baths generally are defined as plating baths which contain less than about 2 ounces/gallon (15 g/l) of cyanide.

Alkaline zinc electroplating baths are prepared from a zinc source and an alkaline material. Sources of zinc ions for aqueous alkaline baths can be alkaline metal zincate such as sodium zincate or potassium zincate. Other sources of zinc ions include zinc oxide, zinc sulfate, zinc acetate, etc. The alkaline material used to form the alkaline baths usually is an alkali metal hydroxide such as sodium hydroxide or potassium hydroxide. When cyanide ion is present, the source of the cyanide can be zinc cyanide, potassium cyanide, sodium cyanide or mixtures of any two or all three of such cyanides. The alkaline zinc plating baths generally will contain from about 4 to 50 grams per liter of zinc ions, from about 60 to 100 grams per liter or more of a base such as sodium hydroxide, and when present, up to about 100 grams per liter of cyanide ion. The pH of the alkaline zinc bath generally will be in the range of from about 10 to about 14, generally above 12, and the pH of the bath can be adjusted by the addition of a base such as sodium hydroxide.

The plating baths of the invention such as those illustrated below will deposit a bright, level and ductile zinc deposit on substrates at conventional temperatures such as about 20° C. to about 60° C. and conventional current densities up to 200 amps per square foot as determined by Hull Cell evaluation. Generally about 25–50 amperes per square foot are used.

The plating baths of the invention may be operated on a continuous or intermittent basis, and from time to time, the components of the bath may have to be replenished. The various components may be added singularly as required or may be added in combination. The amounts of the various compositions to be added to the plating baths may be varied over a wide range depending on the nature and performance of the zinc plating bath to which the composition is added. Such amounts can be determined readily by those skilled in the art.

The alkaline zinc electroplating baths containing the compositions of the invention may be utilized to produce bright zinc deposits on all types of metals and alloys, for example, on iron, zinc die cast, copper and brass. The electroplating baths may be employed in all types of industrial zinc plating processes including still plating baths, high-speed plating baths or strip or wire plating, and in barrel plating.

The bright and lustrous deposits obtained by the aqueous alkaline zinc plating baths containing the polymeric compositions of the invention may be improved if the bath also contains at least one aromatic carbonyl-containing compound which acts as a supplementary brightener imparting optimum levelling action over a wider plating range. The following compounds illustrate the types of aromatic carbonyl-containing compounds which are useful as brighteners in the plating baths of the invention, and these carbonyl compounds include aldehydes, ketones and carboxylic acids and salts: ortho-chlorobenzaldehyde, para-chlorobenzaldehyde, ortho-hydroxybenzaldehyde, aminobenzaldehyde, veratraldehyde, 3,4,5,6-tetrahydrobenzaldehyde, benzaldehyde, vanillin, hydroxybenzaldehyde, anisicaldehyde, benzoic acid, sodium benzoate, sodium salicylate, and 3-pyridine carboxylic acid (nicotinic acid). Mixtures of one or more of the aldehydes with one or more ketones also are useful. The aldehyde brighteners generally are added to the electroplating bath as a bisulfite addition product. When employed in the baths of the invention, the carbonyl-containing brighteners may be included in an amount of from about 0.02 to about 5 g/l or higher and preferably from about 0.03 to 0.5 g/l of bath.

The properties of the zinc deposit from the aqueous alkaline baths of the invention further may be enhanced by including in the baths, other additives conventionally used in such baths. Examples of useful additives include polyvinyl alcohols, manganous sulfate, nickel sulfate and other amine polymers such as those obtained by reacting ammonia with an aldehyde such as formaldehyde.

Other conventional brightening agents such as gelatin, peptone, 3-substituted-N-alkyl pyridium halides and quaternary aliphatic amines also can be utilized in the plating baths of the invention. When used, these brightening agents will be incorporated into the bath in amounts ranging from about 0.005 to about 5 grams per liter of bath. Other examples include water-soluble products made by reacting an amine containing recurring tertiary and/or quaternary amine groups with an epihalohydrin as described in U.S. Pat. No. 3,869,358, and the reaction products of a nitrogen-containing heterocyclic compound such as pyridine, an acyclic amine having at least two functional groups, formaldehyde and an epihalohydrin or glycerol halohydrin as described in U.S. Pat. No. 3,849,325.

Inner salts of quaternized pyridine carboxylic acids also are useful supplementary brighteners which can be included in the alkaline zinc plating baths of the present invention. The salts may be represented by the general formula

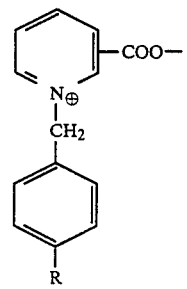

(V)

wherein R is hydrogen or

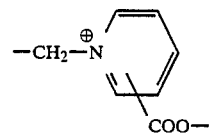

The inner salts may be prepared by quaternizing a pyridine carboxylic acid. The quaternizing agents generally are benzyl halide and substituted benzyl halides. The inner salts also may exist as dimers or higher condensed forms. Preferred examples of inner salts include 1-benzyl pyridinium-3-carboxylate, 1-benzyl pyridinium-4-carboxylate, p-xylyl bis(pyridinium-3-carboxylate), and 1-benzyl pyridium-3, 5-dicarboxylate.

The preparation of the inner salts is represented by the following example. Nicotinic acid (1 mole, 123 parts) is reacted with 1 mole of benzyl chloride (126 parts) in 400 parts of water. Sufficient sodium hydroxide is added to the reaction mixture to provide a pH of 6.0 to 6.5. The mixture is refluxed for 3 hours, cooled, and diluted to give a 10% by weight solution of the inner salt.

Electroplating baths containing the above-described pyridinium inner salts generally also will contain organic polymers such as polyvinyl alcohol and polyethyleneimine. The polyvinyl alcohol may be modified by forming partial esters by condensation with ethylene oxide or glycidol. Polyvinyl alcohols prepared by hydrolysis of polyvinyl acetate are also useful in the plating baths of the present invention. The polyvinyl alcohols prepared by hydrolysis of the corresponding acetates may have molecular weights of from about 5000 to about 20,000.

Water-soluble polyamines and monoalkoxylated polyethyleneimines have been found to be particularly useful in plating baths containing the polymeric compositions of the present invention. Such combinations are synergistic and produce improved brightness and overall deposit appearance. The polyamine supplementary brighteners are prepared by condensing an alkanol amine with an epihalohydrin in proportions of at least about 2 moles of epihalohydrin per mole of alkanol amine to produce a condensation product which is water-soluble and free from epihalohydrin. This condensation product then is reacted with at least 0.3 mole of an amine per mole of the alkanol amine until the total ionic halogen content is at least about 1 mole per mole of alkanol amine. These polyamines are particularly useful when the amine is capable of producing some cross-linking in the polymer. When the polyamine product is to be utilized in the alkaline cyanide-free zinc electroplating baths of the present invention, it is preferred to utilize secondary or tertiary amines such as diethylamine and triethylamine either alone or in mixtures. Most often, bisamines are utilized which contain a tertiary amine function, as for example, dimethylaminopropylamine, so that some cross-linking between polyamine chains can occur. When the polyamines are to be utilized in alkaline cyanide zinc plating baths, it is preferred to react the initial alkanol amine/epihalohydrin condensation products with ammonia or primary amines, and especially primary bisamines such as ethylenediamine so that the final polyamines contain a greater preponderance of primary and secondary amine groups. Polyamines containing a preponderance of tertiary and quaternary amine groups are preferred for electroplating from cyanide-free alkaline zinc baths.

Among the alkanol amines which have been found to yield useful products by the above reaction sequence are monoethanolamine, diethanolamine, triethanolamine, N-methyldiethanolamine, tris-(hydroxymethyl) aminomethane, hydroxyethyl aniline, etc. Diethanolamine is preferred in one embodiment. The epihalohydrin generally is epichlorohydrin although epibromohydrin or epiiodohydrin can be utilized.

Among the amines which have been found useful for the final stage of the reaction are ammonia, ethylamine, diethylamine, triethylamine, ethylenediamine, N,N-dimethylaminopropylamine, imidazole, amino pyridine, etc. Dimethylaminopropylamine and ethylenediamine are preferred amines.

Various combinations and ratios of the reactants may be employed to give useful products although generally it is preferred to use at least about 2 moles of epihalohydrin per mole of alkanolamine for the initial stage of the polymer preparation and to use at least 0.3 mole of the amine for the second stage of the preparation. The optimum amount of amine appears to be in the range of about 0.5 to 1 mole, such as about 0.8 mole, although mole amounts up to one less than the moles of epihalohydrin added can also be used for the production of highly useful products.

The polyamines useful in the invention may be prepared as follows. The alkanolamine is charged to a suitable vessel equipped with stirrer, reflux condenser and temperature recording device. Water or other water miscible solvent such as isopropanol or acetone may be present, but is not required. Epihalohydrin is then added either batchwise or continuously with or without heat or cooling to the reaction vessel in such a manner that the temperature is maintained between about 50°–150° C. The exact conditions of the epihalohydrin addition vary depending on the alkanolamine used. Thus with diethanolamine, a vigorous exotherm occurs, and batchwise addition of epihalohydrin may be used to maintain the temperature of reaction. With triethanolamine, however, only a very slight exotherm occurs; consequently, all the epihalohydrin may be added initially and heat supplied to maintain the temperature of reaction.

After all the epihalohydrin has been added, stirring is continued and the reaction temperature maintained with applied heat if necessary. During this period the mixture becomes increasingly viscous and the ionic chloride content increases approaching a mole value equivalent to that of the alkanolamine initially charged. The increasing ionic chloride content and viscosity are both indicative of the initial polymerization. The extent of polymerization and cross-linking is not critical, but it is considered that the amounts occurring with the preferred processes are desirable. Thus, the molecular weight of the reaction product will be between that of the monomeric product and that found at the solubility limit. The reaction temperature is maintained for about 4–16 hours until the initial product is completely water-soluble, i.e., until there is no evidence of oily, water-insoluble epichlorohydrin on adding the product to water. At this stage the ionic chloride content of the product is usually at least about 0.5 or more per mole per mole of alkanolamine used. After cooling, water is added to this initial product to give a solution containing about 50 weight percent solids followed by the desired quantity of amine or mixed amines, and the whole is refluxed for about two hours to give the desired polyamines. A further description of the preparation of and specific examples of such water-soluble polyamines is found in U.S. Pat. No. 4,046,648 (Rushmere), and the disclosures of this patent is hereby incorporated by reference.

The polyamines are conveniently added to plating baths as aqueous solutions. Such aqueous solution additives may contain from 2–50% of polyamine although generally a concentration range of 2–20% is preferred. Such aqueous addition agents may also contain other brightening agents such as the aromatic aldehydes or pyridinium compounds in amounts of 2–20%.

The monoalkoxylated polyethylene amines useful in the alkaline plating baths of the present invention have been described previously such as in U.S. Pat. No. 4,146,442, the disclosure of which is hereby incorporated by reference. In general, these polymeric compositions are prepared by reacting a poly(alkyleneimine) with a cyclic carbonate consisting of carbon, hydrogen and oxygen atoms. The further description of the preparation of such polymeric products is found in U.S. Pat. No. 2,824,857.

The poly(alkyleneimines) which may be reacted with cyclic carbonates are derived from 1,2-alkyleneimines which may be represented by the general formula

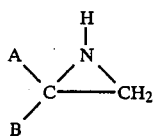

(VI)

wherein A and B may be each independently hydrogen or alkyl groups containing from 1 to about 3 carbon atoms. Where A and B are hydrogen, the compound is ethyleneimine. Compounds wherein either or both A and B are alkyl groups are referred to herein generically as alkyleneimines although such compounds have been referred to also as ethyleneimine derivatives wherein one or both hydrogens from the ethyleneimine are replaced with an alkyl group.

Examples of poly(alkyleneimines) include polymers obtained from ethyleneimine, 1,2-propyleneimine, 1,2-butyleneimine and 1,1-dimethylethyleneimine. The poly(alkyleneimines) useful in the present invention may have molecular weights of from about 200 to about 100,000 or more although the higher molecular weight polymers are not generally as useful since they have a tendency to be insoluble to the zinc plating baths of the invention. Preferably, the molecular weight will be within the range of from about 200 to about 60,000 and more preferably from about 300 to about 2000. Poly(ethyleneimine) having a molecular weight of from about 300 to about 2000 is a preferred example of a poly(alkyleneimine).

The cyclic carbonates which are useful in the preparation of the polymeric nitrogen-containing compounds may be a phenylene carbonate or a cyclic carbonate represented by the following formula

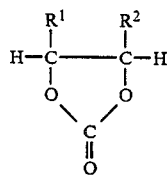

(VII)

wherein $R^1$ and $R^2$ are each independently hydrogen, alkyl, $R^3OCH_2$— wherein $R^3$ is hydrogen or a monovalent hydrocarbon radical, and $R^1$ and $R^2$ taken together may represent an alkylene radical containing at least 2 carbon atoms.

An example of a cyclic carbonate wherein $R^1$ and $R^2$ are hydrogen is ethylene carbonate. Propylene carbonate is an example of a cyclic carbonate wherein $R^1$ is hydrogen and $R^2$ is a methyl group. Glycerol carbonate is an example of a cyclic carbonate wherein $R^1$ is hydrogen and $R^2$ is the HO—$H_2C$— group. Other examples of cyclic carbonates include allyl glycerol carbonate; 2,3-butylene carbonates include allyl glycerol carbonate; butylene carbonate; and carbonates wherein $R^1$ and $R^2$ taken together represent an alkylene radical such as —$CH_2CH_2$—; —$CH_2CH_2CH_2$—; —$CH_2(CH_3)CH$—; —$CH_2CH_2CH_2CH_2$—; —$(CH_2)_5$—, etc.

A class of cyclic carbonates which are useful in the present invention is represented by the general formula

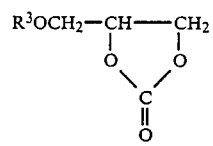

(VIII)

wherein $R^3$ is hydrogen or a monovalent hydrocarbon group. Examples of monovalent hydrocarbon groups include methyl, ethyl, propyl and butyl; cyclopentyl and cyclohexyl, phenyl and tolyl groups.

The preferred examples of the cyclic carbonates are ethylene carbonate and propylene carbonate. These carbonates preferably are reacted with a poly(ethyleneimine) having a molecular weight within the range of from about 200 to about 60,000.

The reaction between the poly(alkyleneimine) and the cyclic carbonate proceeds on mixing of the two reactants. A solvent is not required, but water, alcohols and mixtures of water with alcohols often are used as diluents to facilitate the reaction. Reaction will proceed at room temperature or the mixture may be heated to accelerate the reaction. Accordingly, reaction temperatures between about 20°–100° C. may be useful. The amount of cyclic carbonate reacted with the poly(alkyleneimine) may be varied and, in general, the molar ratio of cyclic carbonate to poly(alkyleneimine) should be sufficient to provide up to one cyclic carbonate molecule for each hydrogen bonded to a nitrogen in the poly(alkyleneimine). Preferably, the weight ratio of poly(alkyleneimine) to cyclic carbonate will vary from about 10:1 to about 10:6. Higher amounts of cyclic carboante may result in a product which is not completely soluble in the plating baths of the invention. Reaction times of about 0.5 to about one hour at the reflux temperature of the mixture are found to be sufficient although the reaction may be conducted for lesser or greater periods of time as desired depending on the particular reactants, the solvent (if any) and other reaction parameters.

The following examples illustrate the procedure for preparing these polymeric nitrogen-containing compounds useful as supplementary additives in the plating baths of the invention.

EXAMPLE I

A mixture of 10 parts of poly(ethyleneimine) having a molecular weight of about 300 and 5 parts of ethylene carbonate is prepared and heated with stirring to about 100° C. for 0.5 hour. Upon cooling, the reaction product solidifies. The solid product can be dissolved in water for future use.

EXAMPLE II

A mixture of 10 parts of poly(ethyleneimine) having a molecular weight of about 1000 and 3 parts of ethylene carbonate in 10 parts of water is heated at the reflux temperature for about 0.5 hour.

EXAMPLE III

The procedure of Example II is repeated except that 20 parts of ethylene carbonate is used in the reaction mixture.

EXAMPLE IV

The procedure of Example II is repeated except that the ethylene carbonate is replaced by 3 parts of propylene carbonate.

EXAMPLE V

A mixture of 10 parts of poly(ethyleneimine) having a molecular weight of about 1800, 30 parts of ethanol and 3 parts of ethylene carbonate is prepared and heated at the reflux temperature for about 0.5 hour.

EXAMPLE VI

A mixture of 10 parts of poly(ethyleneimine) having a molecular weight of about 60,000, 20 parts of water and 5 parts of ethylene carbonate is heated at the reflux temperature for about 0.5 hour.

EXAMPLE VII

A mixture of 20 parts of poly(ethyleneimine) having a molecular weight of 600 and 3 parts of ethylene carbonate is prepared and heated with stirring to about 100° C. for 0.5 hour.

The polymeric nitrogen-containing compounds which are exemplified in Examples I–VI are useful as brightening additive compounds for aqueous alkaline zinc electroplating baths. The amount of such polymeric nitrogen-containing compound added to the alkaline zinc electroplating baths is an amount which is effective in producing a bright and generally level deposit of zinc. Depending on the particular plating bath and the nature of the other compounds contained in the bath, the brightening effective amount of the polymeric nitrogen-containing compositions may range from about 0.01 to about as much as 15–20 grams per liter of bath.

In one embodiment of the invention, additive concentrates of polymeric compositions of the invention in water are prepared, and these concentrates are added to the bath containing zinc ions, alkali and optionally cyanide ions. The other optional additives are added either singly or combined in a second additive concentrate in water.

The following examples illustrate the aqueous alkaline zinc plating baths of the invention and the utility of the baths as determined in standard Hull cells.

EXAMPLE A

| | |
|---|---|
| Zinc metal as sodium zincate | 7.5 g/l |
| Sodium hydroxide | 75.0 g/l |
| Product of Example 6 | 5 ml/l |
| Water | to make 1 liter |

A plating test is conducted in a 267 ml Hull cell at an operating current of 3 amperes for 5 minutes at room temperature. The zinc is deposited on a steel Hull cell panel, and the resulting zinc deposit is bright from 18 to 120 ASF as measured with a Hull cell scale.

EXAMPLE B

Bath of Example A plus 3 ml/1 of a 1% anisic aldehyde-bisulfate solution

A plating test is conducted on this bath as described in Example A, and the resulting zinc deposit is bright from 1.5 to above 120 ASF.

EXAMPLE C

| | |
|---|---|
| Zinc metal as sodium zincate | 7.5 g/l |
| Sodium hydroxide | 75.0 g/l |
| Product of Example 4 | 7.5 ml/l |
| Water | to make 1 liter |

A plating test is conducted on this bath as described in Example A, and the resulting zinc deposit is bright from 9 to 120 ASF.

EXAMPLE D

Bath of Example C plus 4 cc of a 1% methanolic piperonal solution.

A plating test is conducted on this bath as described in Example A, and the resulting zinc deposit is bright from 1.5 to above 120 ASF.

EXAMPLE E

| | |
|---|---|
| Zinc metal as sodium zincate | 7.5 g/l |
| Sodium hydroxide | 75.0 g/l |
| Product of Example 8 | 5 ml/l |
| Veratraldehyde-bisulfite (1% solution) | 3 ml/l |
| Water | to make 1 liter |

A plating test is conducted on this bath as described in Example A, and the resulting zinc deposit is bright from 1.5 to above 120 ASF.

EXAMPLE F

| | |
|---|---|
| Zinc metal as potassium zincate | 7.5 g/l |
| Potassium hydroxide | 105 g/l |
| Product of Example 11 | 5 ml/l |
| Vanillin (1% solution in methanol) | 4 ml/l |
| Water | to make 1 liter |

A plating test is conducted on this bath as described in Example A, and the resulting zinc deposit is bright from 3 to above 120 ASF.

EXAMPLE CONTROL-1

| | |
|---|---|
| Zinc | 7.5 g/l |
| Sodium cyanide | 7.5 g/l |
| Sodium hydroxide | 75.0 g/l |
| 1-benzyl pyridinium 3-carboxylate (BPC) | 1 g/l |
| Polyvinyl alcohol (PVA) | 0.02 g/l |
| Water | to make 1 liter |

A steel cathode is plated at 3 amperes for 5 minutes at 65°–85° F. in a Hull cell and the resulting deposit is hazy in appearance and has striations at lower current densities.

EXAMPLE G

To the bath of Example Control-1, there is added 6 cc/l of a 10% solution (water) of the product of Example 6. The resulting Hull cell panel deposit shows a significant increase in brightness over the entire current density range.

EXAMPLE H

To the bath of Example Control-1, there is added 4 ml/l of a 10% solution (water) of the product of Example 11. The brightness of the deposit on a Hull cell panel above 3 ASF is significantly enhanced. Below 3 ASF, the panel is bright but streaked.

EXAMPLE CONTROL-2

| | |
|---|---|
| Zinc | 15 g/l |
| Sodium cyanide | 25 g/l |
| Sodium hydroxide | 75.0 g/l |
| 1-benzyl pyridium 3-carboxylate | 2.5 g/l |
| Polyvinyl alcohol | 0.025 g/l |
| Water | to make 1 liter |

A steel Hull cell panel plated with this bath at 3 amperes for 5 minutes is smooth and reflective but is covered by a dulling haze.

EXAMPLE I

Bath of Example Control-2 plus 5 ml/l of a 10% solution (water) of the product of Example 4. The brightness is significantly enhanced from 0–20 ASF. Above 20 ASF, the deposit is still somewhat hazy.

EXAMPLE J

Bath of Example Control-2 plus 3.7 ml/l of a 10% solution (water) of the product of Example 9. The resulting panel is full bright from 0 to above 120 ASF.

EXAMPLE K

Bath of Example Control-2 plus 3.7 ml/l of a 10% solution (water) of product of Example 7. The resulting panel is bright with striations from 0–18 ASF and full bright above 18 ASF.

EXAMPLE L

| | |
|---|---|
| Zinc | 15 g/l |
| NaCN | 25 g/l |
| NaOH | 75 g/l |
| BPC | 1 g/l |
| PVA | 0.02 g/l |
| Product of Example 11 (10% solution) | 4 ml/l |
| Water | to make 1 liter |

A Hull cell panel (1 amp/10 min.) is bright; below 12 ASF, the deposit has a mottled streaky appearance.

EXAMPLE M

To the bath of Example L is added 2 cc of a 5% solution of the reaction product of Example VII. The resulting 1 amp/10 min. Hull cell panel is bright over the entire panel and has a smooth mirror-like appearance.

EXAMPLE N

| | |
|---|---|
| Zinc | 15 g/l |
| NaCN | 25 g/l |
| NaOH | 75 g/l |
| BPC | 2.5 g/l |
| PVA | 0.025 g/l |
| Product of Example 4 (10% solution) | 5 ml/l |
| Water | to make 1 liter |

A Hull cell panel (1 amp/10 min.) is bright but somewhat hazy above 20 ASF.

EXAMPLE O

To the bath of Example N there is added 2.5 cc of a 3% solution of the reaction product of diethanol amine and epichlorohydrin which is then reacted with 3-dimethylaminopropylamine prepared by the general procedure of Preparation 2 of U.S. Pat. No. 4,046,648 (Rushmere). The resulting Hull cell panel (1 amp/10 min.) is bright with no haze above 20 ASF although some streaking is present below 6 ASF.

The components of the plating baths can be replenished by adding the various compositions individually or in combinations, generally as additive concentrates. Additive concentrates contain one or more additives dissolved in a solvent such as water, alcohol, or water-alcohol mixtures. Generally the additive concentrates will contain as much as 70 to 90 parts of the polymeric composition of the invention and one or more other additives as described above, and 10 to 30 parts of solvent, preerably water or a methanol-water mixture.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A polymeric composition prepared by the process which comprises the steps of
   (A) preparing an intermediate by reacting
   (A-1) at least one nitrogen-containing heterocyclic compound with
   (A-2) an epihalohydrin, glycerolhalohydrin or mixtures thereof, and
   (B) reacting said intermediate with at least one amidine compound to form the desired polymeric composition.

2. The polymeric composition of claim 1 wherein the nitrogen-containing heterocyclic compound (A-1) is a triazole, imidazole, pyrazole, pyrrole, piperazine, or saturated cyclic amine.

3. The polymeric composition of claim 1 wherein the nitrogen-containing heterocyclic compound (A-1) is an imidazole.

4. The polymeric composition of claim 1 wherein (A-2) is epichlorohydrin.

5. The polymeric composition of claim 1 wherein the amidine compound is characterized by the formula $$R^1C(NR^2)N(R^3)_2$$

wherein $R^1$ is hydrogen, lower alkyl, aryl or $N(R^3)_2$, $R^2$ is hydrogen, lower alkyl or cyano group, and each $R^3$ is hydrogen or a lower alkyl group.

6. The polymeric composition of claim 1 wherein the amidine compound is guanidine, an alkyl-substituted guanidine or the acid salts thereof.

7. The polymeric composition of claim 5 wherein $R^2$ and each $R^3$ is hydrogen and $R^1$ is an alkyl group containing 1 or 2 carbon atoms.

8. The polymeric composition of claim 1 wherein the molar ratio of (A-2) to (A-1) is from about 0.2:1 to about 5:1.

9. The polymeric composition of claim 1 wherein the molar ratio of amidine to the nitrogen-containing heterocyclic compound (A-1) is from about 0.05:1 to about 2:1.

10. A polymeric composition prepared by the process which comprises the steps of
(A) preparing an intermediate by reacting
(A-1) imidazole or an alkyl-substituted imidazole with
(A-2) an epihalohydrin in a mole ratio of from about 1:0.2 to about 1:5, and
(B) reacting said intermediate with an amidine compound characterized by the formula $$R^1C(NR^2) N (R^3)_2$$

wherein $R^1$ is hydrogen, lower alkyl, aryl or $N(R^3)_2$, $R^2$ is hydrogen or a cyano group, and each $R^3$ is hydrogen or a lower alkyl group, the molar ratio of amidine to imidazole or alkyl-substituted imidazole being from about 0.05:1 to about 2:1 to form the desired polymeric compound.

11. The composition of claim 10 wherein the epihalohydrin is epichlorohydrin.

12. The composition of claim 10 wherein (A-1) is imidazole.

13. The composition of claim 10 wherein the amidine compound is guanidine, an alkyl-substituted guanidine, or the acid salts thereof.

14. The composition of claim 10 wherein each $R^3$ is hydrogen or a methyl group.

15. The composition of claim 10 wherein the reactions in steps (A) and (B) are conducted in the presence of water.

16. The composition of claim 15 wherein the reaction in step (B) is conducted at an elevated temperature up to the reflux temperature of the mixture.

17. A polymeric composition prepared by the process which comprises the steps of
(A) preparing an intermediate by reacting
(A-1) imidazole with
(A-2) epichlorohydrin in the presence of water, the molar ratio of imidazole to epichlorohydrin being within the range of from about 1:0.2 to about 1:5, and
(B) reacting said intermediate with an amidine compound characterized by the formula $$R^1C(NR^2)N(R^3)_2$$

wherein $R^1$ is hydrogen, methyl, N $(R^3)_2$ and each $R^3$ is hydrogen or a methyl group, or the acid salts thereof, the molar ratio of amidine compound to imidazole being from about 0.05:1 to about 2:1.

18. An aqueous alkaline electroplating bath suitable for producing bright metallic zinc deposits comprising a source of zinc ions and an effective amount, sufficient to yield a bright zinc deposit, of the polymeric composition of claim 1.

19. The plating bath of claim 18 also containing at least one aromatic carbonyl compound.

20. The plating bath of claim 18 also containing at least one polymeric nitrogen-containing compound prepared by reacting a poly (alkyleneimine) with a cyclic carbonate consisting of carbon, hydrogen and oxygen atoms.

21. The plating bath of claim 18 also containing at least one bath-soluble polyamine brightener prepared by condensing an alkanolamine with an epihalohydrin, and reacting said condensation product with at least 0.3 mole of ammonia or an amine other than alkanolamine per mole of alkanolamine until the total ionic halogen is at least about 1 mole per mole of alkanolamine.

22. The plating bath of claim 18 also containing at least one inner salt of a quaternized pyridine carboxylic acid of the formula

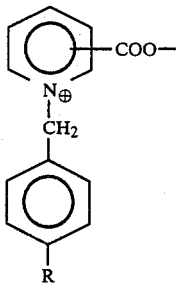

wherein R is hydrogen or

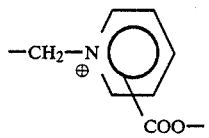

23. An aqueous alkaline electroplating bath suitable for producing bright metallic zinc deposits comprising a source of zinc ions and an effective amount, sufficient to yield a bright zinc deposit, of the composition of claim 10.

24. An aqueous alkaline electroplating bath suitable for producing bright metallic zinc deposits comprising a source of zinc ions and an effective amount, sufficient to yield a bright zinc deposit, of the composition of claim 17.

25. The plating bath of claim 18 containing less than about 15 g/l of cyanide.

26. The plating bath of claim 23 containing less than about 15 g/l of cyanide.

27. The plating bath of claim 24 containing less than about 15 g/l of cyanide.

28. An additive concentrate for alkaline zinc plating baths comprising water and from about 10% to about 90% by weight of the polymeric composition of claim 1.

29. An additive concentrate for alkaline zinc plating baths comprising water and from about 10% to about 90% by weight of the polymeric composition of claim 10.

* * * * *